United States Patent [19]

Heidelberg et al.

[11] Patent Number: 5,343,971
[45] Date of Patent: Sep. 6, 1994

[54] ELECTRIC VEHICLE WITH INDIVIDUALLY CONTROLLED DRIVE ELECTROMOTORS

[75] Inventors: Götz Heidelberg, Starnberg-Percha; Andreas Gründl; Peter Ehrhart, both of München, all of Fed. Rep. of Germany

[73] Assignee: Magnet-Motor Gesellschaft für Magnetmotorischetechnik mbH, Starnberg, Fed. Rep. of Germany

[21] Appl. No.: 949,632

[22] PCT Filed: Apr. 5, 1991

[86] PCT No.: PCT/EP91/00656
§ 371 Date: Dec. 4, 1992
§ 102(e) Date: Dec. 4, 1992

[87] PCT Pub. No.: WO91/15378
PCT Pub. Date: Oct. 17, 1991

[30] Foreign Application Priority Data

Apr. 6, 1990 [DE] Fed. Rep. of Germany ....... 4011291

[51] Int. Cl.$^5$ ..................... B60K 1/02; B60L 11/02
[52] U.S. Cl. ..................... 180/65.4; 318/139
[58] Field of Search ............. 180/65.1, 65.2, 65.3, 180/65.4, 65.5; 318/139

[56] References Cited

U.S. PATENT DOCUMENTS

| | | | |
|---|---|---|---|
| 4,363,999 | 12/1982 | Preikschat | 318/139 X |
| 4,471,273 | 9/1984 | Melocik et al. | 318/139 X |
| 4,495,451 | 1/1985 | Barnard | 180/65.4 X |
| 4,951,769 | 8/1990 | Kawamura | 180/65.4 |
| 4,953,646 | 9/1990 | Kim | 180/65.4 |

FOREIGN PATENT DOCUMENTS

| | | |
|---|---|---|
| 0046997 | 3/1982 | European Pat. Off. . |
| 2621374 | 11/1977 | Fed. Rep. of Germany . |
| 3725620 | 2/1989 | Fed. Rep. of Germany . |
| 2592342 | 7/1987 | France ..................... 180/65.4 |
| 484765 | 3/1970 | Switzerland . |
| 2135478 | 8/1984 | United Kingdom . |
| 9011905 | 10/1990 | World Int. Prop. O. ......... 180/65.5 |

Primary Examiner—Brian L. Johnson
Assistant Examiner—Peter C. English
Attorney, Agent, or Firm—Spencer, Frank & Schneider

[57] ABSTRACT

A non-rail bound vehicle comprising at least two drive electromotors (8), the one thereof being provided for driving a driving wheel (12) on the left side of the vehicle and the other one thereof being provided for driving a driving wheel (12) on the fight side of the vehicle, characterized in that each of the two electromotors (8) has its own motor control (30) associated therewith for presetting the instantaneous nominal power and/or the instantaneous nominal speed of the respective electromotor (8); and that a superior central control (28) connected to the central controls (30) is provided which controls the two electromotors (8) via the motor controls (30) so as to prevent drive slip and/or brake locking and/or to provide a fight/left drive differential that is favourable in terms of movement dynamics, with the central control (28) and/or the motor controls (30) taking into account information on the instantaneous actual electrical power and/or the instantaneous actual speed of the two electromotors (8).

43 Claims, 1 Drawing Sheet

ELECTRIC VEHICLE WITH INDIVIDUALLY CONTROLLED DRIVE ELECTROMOTORS

BACKGROUND OF THE INVENTION

1. Field of the Invention

The invention relates to the field of non-rail bound vehicles.

2. Background Information

In conventional electric vehicles, the driving power desired at a particular moment was preset by the driver via a motor control. In contrast thereto, in the vehicle according to the invention the instantaneous operating condition of the two electromotors is taken into consideration and a central control is superimposed on the motor control proper, which provides superior aspects in terms of movement dynamics, in particular drive slip prevention (in the sense of preventing considerable drive slip), brake locking prevention (when braking of the vehicle takes place by means of the electromotors now operating in the generator mode), right/left drive differential and the like. The motor control and/or the central control are continuously fed with information on the instantaneous voltage, current intensity and speed and calculate therefrom the instantaneous power and the instantaneous torque of the particular electromotor.

In conventional internal combustion electric vehicles, the drive electromotor was controlled in terms of its power by the presetting performed by the driver via a motor control. The internal combustion motor which in the end must make available the power required for generating the necessary electrical energy was varied in its speed in accordance with the power requirements of the drive electromotor. In the vehicle according to the invention, however, the respective instantaneously required current generation is effected such that the internal combustion engine is brought into an operating condition which is favourable in terms of superior aspects, in particular as regards optimized fuel consumption, optimum low pollutant emissions, high power output or the like. In concrete terms, the current generation control takes place e.g. such that the required internal combustion engine power is generated at a speed/torque combination as close as possible to the optimum point of the consumption characteristics of the internal combustion engine. The same applies analogously for the optimum pollutant emission and the optimum power output. The current generation control may be associated with the internal combustion engine only, or both with the internal combustion engine and with the current generator.

SUMMARY OF THE INVENTION

It is pointed out that the described first aspect of the invention and the described second aspect of the invention may also be realized in combined form. In this event, a central control may be provided that unites the functions of the two central controls described. Furthermore, it is expressly pointed out that, with respect to the described second aspect of the invention, it is not absolutely necessary that at least two drive electromotors are provided. The second aspect of the invention can also be realized with vehicles having only one drive electromotor and only one motor control associated with this electromotor.

The terms nominal power, nominal speed, actual power, and actual speed, as used hereinbefore, are to be understood to the effect that these contain indirectly a statement on the nominal torque and actual torque, respectively, since the applicable equation is power = torque x speed.

The vehicle according to the invention may have a drive electromotor of its own for each vehicle wheel, with a four-wheel drive vehicle being indicated as the most typical example.

In the prevention of excessive drive slip and/or brake locking prevention as described in the application, preferably all vehicle wheels coupled with an electromotor are taken into account, with the possibility that a difference may result in control of the front wheels and of the rear wheels. In the light of the described "drive differential advantageous in terms of movement dynamics" all driven vehicle wheels on the same side of the vehicle are preferably controlled substantially analogously. However, a design is also possible in which—possibly without a right/left differential—electromotors for driven front wheels are controlled differently from electromotors for driven rear wheels. This holds in particular for the possibility of control with respect to maximum traction at controlled slippage, as described hereinbelow.

The central control preferably is designed such that, for drive slip prevention and/or for brake locking prevention, it is responsive to an abnormally high or low speed of at least one of the two electromotors and/or to an abnormal speed change of at least one of the two electromotors and/or to an abnormal speed differential between the two electromotors. In case more than two electromotors are provided, the central control can be responsive to an abnormal speed differential between the speed of one electromotor and the (averaged) speed of the other electromotors. The central control, in the manners mentioned, detects a beginning drive slippage and/or beginning brake locking condition of at least one vehicle wheel.

The central control preferably is designed such that it controls the two electromotors via the motor controls such that these have essentially the same speed or do not exceed a predetermined maximum speed differential. The effect achieved thereby is that of a mechanical locking differential, possibly a locking differential having a locking effect below 100%. A mechanical locking differential having a locking effect below 100% also lockingly engages only when a predetermined speed or torque differential between the two associated driving wheels is exceeded.

A further preferred possibility consists in that the motor control and/or the central control, from information on the instantaneous voltage, current intensity and speed, calculates the instantaneous power, i.e. the power input, or—upon efficiency correction—the power output, of the respective electromotor as well as the power consumed for the (rotational) acceleration of the respective driving group (rotor of electromotor, possibly articulated shaft, possibly transmission, driving wheel), e.g. on the basis of the change of the electromotor speed in terms of time. The difference constitutes the respective driving wheel output power. When the driving wheel output powers are compared with the vehicle acceleration or vehicle speed obtained, the electromotors may be controlled such that an optimum conversion of the power of the driving wheels into vehicle propulsion is achieved. Vehicle acceleration or vehicle speed can be ascertained in particular by means of an acceleration sensor, speed detection on a non-driven wheel, wheel speed comparison or repeated short-term de, activation of an electromotor the speed of which is then representative of the vehicle speed.

The central control preferably is designed so as to control the two electromotors via the motor controls so as to achieve low drive slip which is advantageous for maximum traction, with the control criterion being preferably the maximum of the traction power. For, in case of ground on which driving wheels easily tend to slip considerably, for instance snow, sand, soft ground, the optimum vehicle traction is achieved when there is already a certain slippage between the driving wheels and the ground.

The anti-slip or antiskid control may also take further external parameters into consideration, in particular information on the spring compression condition of the vehicle or information on longitudinal and transverse acceleration of the vehicle.

The central control preferably is designed so as to be responsive to the steering angle and/or rotation of the vehicle about its vertical axis for generating a right/left drive differential. In the first-mentioned case, preferably a steering angle sensor is provided. The power outputs or speeds or torques, respectively, delivered by the electromotors are controlled such that the electromotors contribute in the angular acceleration of the vehicle about its vertical axis during cornering. The major situation for the second case are yawing movements or swerving movements of the vehicle about its vertical axis. This can be counteracted by corresponding torque application on the driving wheels which acts in the opposite direction.

According to a further aspect of the invention, the central control has at least one external sensor connected thereto. This is preferably a steering angle sensor, a distance sensor for detecting other vehicles approached by the vehicle or approaching the vehicle, an inclination sensor or a positionally stable gyroplatform, preferably a laser gyro, detecting linear and/or angular accelerations of the vehicle in all or the most essential directions or about all or the most essential axes. It is expressly pointed out that the just described aspect of the invention may also be realized independently of the two aspects of the invention outlined at the beginning of the specification. For the aspect of the invention described now, it is in particular not cogently necessary that an antiskid control and/or an antilocking control and/or a right/left drive differential control are provided and that an internal combustion engine control is cogently provided under optimizing aspects. Furthermore, it is possible to have specific driving programs stored in the central control, in particular specific vehicle acceleration programs, one or more parking programs for automatic parking-in and the like. The central control may store other superior functions of any kind. The driving programs may be subjected to the influence of the other controls described in the application.

It is in general advantageous to dispose the heaviest vehicle components preferably at the front and rear ends of the vehicle so as to increase the vehicle's moment of inertia about the vertical axis and to thus improve the driving performance of the vehicle.

Preferably at least one command generator provided for the driver, in particular for vehicle acceleration or vehicle speed and/or vehicle deceleration, is connected to the central control.

The two electromotors preferably constitute a combined tandem motor having a common stationary part (preferably with two stator rings) and two rotor parts. The common stationary part may contain the power and information wiring and possibly the coolant supply and coolant discharge. Furthermore, the stationary part may have peripheral parts of the two motor controls disposed thereon, in particular speed detection, speed differential detection, temperature monitoring, and the like.

The electromotors may each be connected to the associated driving wheel via a shaft, in particular an articulated shaft, or may be directly associated with the particular driving wheel in spatially close manner, for instance in the form of a wheel-integrated drive motor.

With specific designs it is favourable and therefore preferred to provide a reduction gear system between the particular electromotor and the particular driving wheel since the motor concerned can then be provided as a rapidly rotating motor with high power concentration. The reduction gear system may also constitute an integrated unit with the electromotor or the driving wheel concerned. The reduction gear system may be a gear system with fixed reduction ratio or a multistage switchable reduction gear system. As a rule a reduction gear system having two stages is sufficient here, e.g. one stage serving mainly for driving in cities or cross-country and the other stage serving mainly for driving outside cities.

The vehicle preferably comprises an internal combustion engine and at least one current generator drivable by the latter, so that the current required for the electromotors can be produced in the vehicle. However, it is also possible to utilize a different current source or a chemical current accumulator.

The generator preferably has the same construction as a drive electromotor, with the possibility of a winding formation with a different winding number per pole as compared to the electromotor design and/or a different winding connection. Due to the fact that the generator normally is designed for maximum power at maximum speed, one generator having substantially the same construction as an electromotor is sufficient for feeding several electromotors. If applicable, several generators, preferably of the same construction, may be coupled to the internal combustion engine.

The generator preferably is integrated on the internal combustion engine. This internal combustion engine/generator unit may be disposed virtually at any location in the vehicle where sufficient space is available, since no mechanical drive emanates from this unit.

The generator preferably has a separate coil for generating current for the vehicle's onboard electrical system. An alternative consists in that a current branch is provided at the generator or the circuit fed by the generator for the purpose of feeding the vehicle's onboard electrical system, with a transformer or a set-down inverter being preferably provided for producing the onboard supply voltage. The reason therefor is that the vehicle is preferably designed such that the generator delivers a relatively high voltage for the electromotors, preferably in the range from 500 to 1000 V, whereas the onboard supply voltage is usually 12 V. With such high generator voltages, the currents flowing in the electromotors are agreeably low.

The generator preferably is designed such that it is operable as a starter for the internal combustion engine, i.e. as a starter electromotor. It is possible to provide a separate starter coil in the generator for this purpose. It is to be understood that, for operating the starter, a current source or accumulator for electrical energy is usually provided in the vehicle. However, the voltage level thereof may be raised or set up to a voltage level appropriate for the starter by means of a transformer and/or a set-up controller. It is preferred as advantageous to design the generator such that it starts the internal combustion engine with a speed that is considerably above the idling speed, in particular a starting speed of more than 40% of the maximum speed of the internal combustion engine. This ensures particularly easy starting of the internal combustion engine.

The electromotors preferably are adapted to be switched over to generator operation for braking the vehicle, and preferably at least one braking resistor is provided for dissipating braking energy. It may also be provided that the current produced during braking is fed to the vehicle's current accumulator as long as the latter is capable of taking up current.

The electromotors and/or the generator preferably are machines excited by permanent magnets, with the permanent magnets being highly coercive permanent magnets, for instance of an alloy of at least one rare earth element with cobalt or iron and optionally at least one further addition. Such machines can be built with a particularly high power density.

The electromotors preferably are electronically commutated machines to be fed with direct current.

The electromotors and/or the generator preferably are constructed in accordance with the principle of magnetic flux concentration. Magnetic flux concentration preferably means that the magnetic flux density is greater in the air gap than at the magnetic flux exit area of the permanent magnet concerned.

BRIEF DESCRIPTION OF THE DRAWINGS

The invention and developments of the invention will now be elucidated in more detail by way of an embodiment shown in the drawing. The sole drawing figure shows, in very schematic manner, a four-wheeled road vehicle in a plan view, illustrating in particular the electric drive, current generating and control components of the vehicle.

DETAILED DESCRIPTION OF THE PREFERRED EMBODIMENTS

Figure 1:
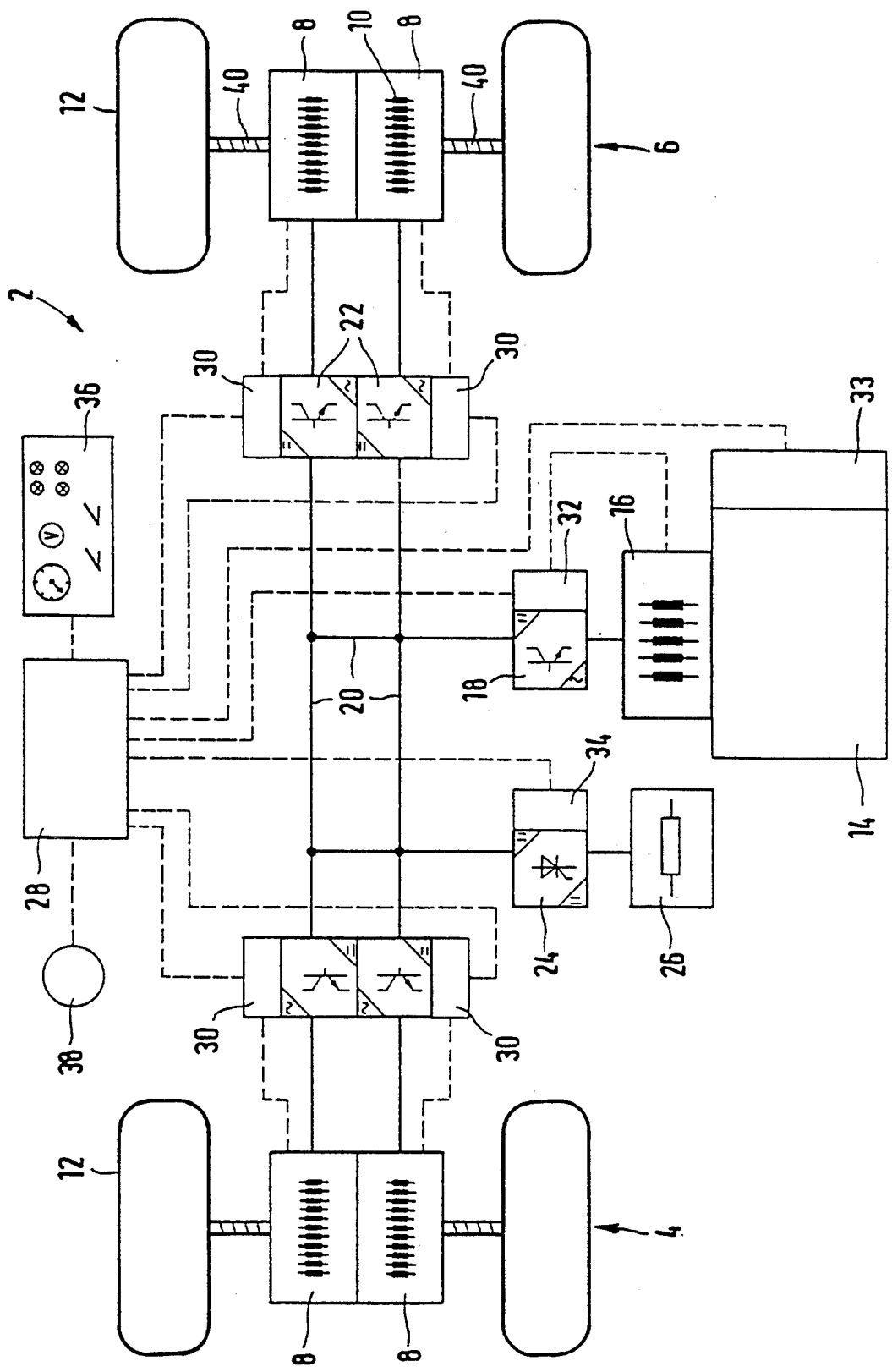

Both on the front axle 4 and on the rear axle 6 of the vehicle 2, there are provided two drive electromotors 8 each. The two electromotors 8 of one axle constitute a tandem motor having a common stationary part. Within each electromotor, the individual winding coils 10 are outlined schematically. It can be seen that the common stationary part contains separate winding coils 10 for each individual motor 8. The rotor of each motor 8 is equipped with permanent magnets. Each electromotor 8 drives an associated driving wheel 12.

Reference numeral 14 designates an internal combustion engine. The internal combustion engine 14 has a generator 16 associated therewith in close spatial relationship. The current produced in the generator 16 is rectified in a power electronics means 18 and fed from there in a d.c. voltage intermediate circuit 20.

Connected to the d.c. voltage intermediate circuit 20 are the four electromotors 8, each being connected thereto via a power electronics means in the form of a current controller 22. Each current controller 22 feeds current pulses to the associated electromotor 8 at the correct time and with the correct sign.

Connected furthermore to the d.c. voltage intermediate circuit 20 is a braking controller 24 having one or more braking resistors 26 connected thereto.

Reference numeral 28 designates a microprocessor system constituting a central control of the vehicle 2. The central control 28 is connected via information lines to the four motor controls 30 of the four electromotors 8, to a control 32 associated with the power electronics means 18, to a control 33 associated with the internal combustion engine 14, and to a braking control 34 associated with the braking controller 24. The controls 32 and 33 constitute a current generating control. Furthermore, an operating and display unit 36 as well as one or more external sensors 38 are connected to the central control 28. Each motor control 30 is connected to the associated electromotor by a signal line. The control 32 is connected to the generator 16 by a signal line.

For performing the afore-mentioned electronic commutation of each electromotor 8, the respective motor control 30 receives signals from a rotational position sensor, not shown, which continuously detects the rotational position of the respective rotor relative to the respective stator.

Each motor control 30 continuously receives information on the instantaneous voltage, current intensity and speed and calculates therefrom the instantaneous power and the instantaneous torque of the associated electromotor 8, either from the respective electromotor 8 or from the respective current controller 22. The central control 28 processes this information from all electromotors 8 and takes it into account for its control commands to the motor controls 30 for fulfilling the functions described hereinbefore. It is possible to design the motor controls 30 and/or the central control 28 such that it performs the further functions (detection of speed changes, calculation of the wheel driving line, determination of propulsion, etc.) described in the introductory part of the specification.

The current generating circuit 32, 33 receives from the central control 28 commands as to the necessary current generation. On the basis of these commands the current generating control 32, 33 issues commands to the controlled rectifier 18 in the form of a four-quadrant controller, to the generator 16 and to the internal combustion engine 14. The current generating circuit 32, 33 can control these components such that the internal combustion engine 14 performs the functions described hereinbefore, and in particular operates close to the optimum fuel consumption point of its performance characteristics.

The motor controls control the nominal condition of the electromotors 8 with respect to power, torque and speed.

The central control 28 effects furthermore, via the motor controls 30, switching of the electromotors 8 to generator operation for decelerating the vehicle 2 and, via the braking control 34, the dissipation of braking energy in the braking resistor or resistors 26.

The electromotors 8, the generator 16, the motor controllers 22, the rectifier 18, the braking controller 24, and the central control 28 each are of multiple construction. This means that these components each consist of several independent sub-components functioning per se, so that even in case of failure of some sub-components the overall function is not impaired considerably.

We claim:

1. A non-rail bound vehicle comprising:
   (a) at least two drive electromotors, a first one thereof being provided for driving a driving wheel on the left side of the vehicle and a second one thereof being provided for driving a driving wheel on the right side of the vehicle;
   (b) each of the at least two electromotors has a respective motor controller associated therewith for presetting an instantaneous nominal torque of the respective electromotor;
   (c) a superior central controller which is connected to the motor controllers and controls the at least two electromotors via the motor controllers to prevent drive slip;
   (d) with at least one of the superior central controller and the motor controllers obtaining and utilizing information on:
   the instantaneous actual electrical power, of the at least two electromotors
   the instantaneous actual speed of the at least two electromotors, and
   the instantaneous actual torque of the at least two electromotors.

2. A vehicle according to claim 1, further comprising an internal combustion engine and at least one current generator drivable by the internal combustion engine.

3. A vehicle according to claim 2, wherein the generator is operable as a starter for the internal combustion engine.

4. A vehicle according to claim 2, wherein at least one of the at least two electromotors and the generator is a machine excited by permanent magnets, with the permanent magnets being highly coercive permanent magnets.

5. A vehicle according to claim 1, further comprising a steering angle sensor, wherein the central controller is responsive to a steering angle of the vehicle detected by the steering angle sensor, for generating a right/left drive differential.

6. A vehicle according to claim 1, wherein the central controller is responsive to rotation of the vehicle about its vertical axis for generating a right/left drive differential.

7. A vehicle according to claim 1, wherein the at least two electromotors are switchable to generator operation for braking the vehicle, and wherein at least one braking resistor is provided for dissipating braking energy.

8. A non-rail bound vehicle comprising:
   (a) at least two drive electromotors, a first one thereof being provided for driving a driving wheel on the left side of the vehicle and a second one thereof being provided for driving a driving wheel on the right side of the vehicle;
   (b) each of the at least two electromotors has a respective motor controller associated therewith for presetting an instantaneous nominal torque of the respective electromotor;
   (c) a superior central controller which is connected to the motor controllers and controls the at least two electromotors via the motor controllers to prevent brake locking;
   (d) with at least one of the superior central controller and the motor controllers obtaining and utilizing information on:
   the instantaneous actual electrical power, of the at least two electromotors
   the instantaneous actual speed of the at least two electromotors, and
   the instantaneous actual torque of the at least two electromotors.

9. A vehicle according to claim 8, further comprising an internal combustion engine and at least one current generator drivable by the internal combustion engine.

10. A vehicle according to claim 9, wherein the generator is operable as a starter for the internal combustion engine.

11. A vehicle according to claim 9, wherein at least one of the at least two electromotors and the generator is a machine excited by permanent magnets, with the permanent magnets being highly coercive permanent magnets.

12. A vehicle according to claim 8, further comprising a steering angle sensor, wherein the central controller is responsive to a steering angle of the vehicle detected by the steering angle sensor, for generating a right/left drive differential.

13. A vehicle according to claim 8, wherein the central controller is responsive to rotation of the vehicle about its vertical axis for generating a right/left drive differential.

14. A vehicle according to claim 8, wherein the at least two electromotors are switchable to generator operation for braking the vehicle, and wherein at least one braking resistor is provided for dissipating braking energy.

15. A non-rail bound vehicle comprising:
   (a) at least two drive electromotors, a first one thereof being provided for driving a driving wheel on the left side of the vehicle and a second one thereof being provided for driving a driving wheel on the right side of the vehicle;
   (b) each of the at least two electromotors has a respective motor controller associated therewith for presetting an instantaneous nominal torque of the respective electromotor;
   (c) a superior central controller which is connected to the motor controllers and controls the at least two electromotors via the motor controllers to provide a right/left drive differential that is favorable in terms of movement dynamics;
   (d) with at least one of the superior central controller and the motor controllers obtaining and utilizing information on:
   the instantaneous actual electrical power, of the at least two electromotors
   the instantaneous actual speed of the at least two electromotors, and
   the instantaneous actual torque of the at least two 16. A vehicle according to claim 15, further comprising an internal combustion engine and at least one current generator drivable by the internal combustion engine.

17. A vehicle according to claim 16, wherein the generator is operable as a starter for the internal combustion engine.

18. A vehicle according to claim 16, wherein at least one of the at least two electromotors and the generator is a machine excited by permanent magnets, with the permanent magnets being highly coercive permanent magnets.

19. A vehicle according to claim 15, further comprising a steering angle sensor, wherein the central controller is responsive to a steering angle of the vehicle detected by the steering angle sensor, for generating a right/left drive differential.

20. A vehicle according to claim 15, wherein the central controller is responsive to rotation of the vehicle about its vertical axis for generating a right/left drive differential.

21. A vehicle according to claim 15, wherein the at least two electromotors are switchable to generator operation for braking the vehicle, and wherein at least one braking resistor is provided for dissipating braking energy.

22. A non-rail bound vehicle comprising:
(a) at least two drive electromotors, a first one thereof being provided for driving a driving wheel on the left side of the vehicle and a second one thereof being provided for driving a driving wheel on the right side of the vehicle;
(b) each of the at least two electromotors has a respective motor controller associated therewith for presetting an instantaneous nominal torque of the respective electromotor;
(c) a superior central controller which is connected to the motor controllers and controls the at least two electromotors via the motor controllers to provide a favorable power transmission of the driving wheels;
(d) with at least one of the superior central controller and the motor controllers obtaining and utilizing information on:
the instantaneous actual electrical power, of the at least two electromotors
the instantaneous actual speed of the at least two electromotors, and
the instantaneous actual torque of the at least two electromotors.

23. A vehicle according to claim 22, further comprising an internal combustion engine and at least one current generator drivable by the internal combustion engine.

24. A vehicle according to claim 23, wherein the generator is operable as a starter for the internal combustion engine.

25. A vehicle according to claim 23, wherein at least one of the at least two electromotors and the generator is a machine excited by permanent magnets, with the permanent magnets being highly coercive permanent magnets.

26. A vehicle according to claim 22, further comprising a steering angle sensor, wherein the central controller is responsive to a steering angle of the vehicle detected by the steering angle sensor, for generating a right/left drive differential.

27. A vehicle according to claim 22, wherein the central controller is responsive to rotation of the vehicle about its vertical axis for generating a right/left drive differential.

28. A vehicle according to claim 22, wherein the at least two electromotors are switchable to generator operation for braking the vehicle, and wherein at least one braking resistor is provided for dissipating braking energy.

29. A non-rail bound vehicle comprising:
(a) at least one drive electromotor;
(b) an internal combustion engine and a current generator adapted to be driven by the internal combustion engine;
(c) the at least one electromotor has a respective motor controller associated therewith for presetting an instantaneous nominal torque of the at least one electromotor;
(d) the internal combustion engine/generator group has a current generating controller associated therewith; and
(e) a central controller which is connected to the respective motor controller of the at least one electromotor and to the current generating controller and which, based on the electrical power requirements of the at least one electromotor, controls the internal combustion engine via the current generating controller to achieve low fuel consumption.

30. A vehicle according to claim 25, wherein the at least one drive electromotor comprises at least two drive electromotors, a first one thereof being provided for driving a driving wheel on the left side of the vehicle and a second one thereof being provided for driving a driving wheel on the right side of the vehicle, each of the at least two electromotors having a respective motor controller associated therewith, and the central controller controls the internal combustion engine via the current generating controller based on the electrical power requirements of the at least two electromotors.

31. A vehicle according to claim 25, wherein the generator is operable as a starter for the internal combustion engine.

32. A vehicle according to claim 25, wherein the at least one electromotor is switchable to generator operation for braking the vehicle, and wherein at least one braking resistor is provided for dissipating braking energy.

33. A vehicle according to claim 29, wherein at least one of the at least one electromotor and the generator is a machine excited by permanent magnets, with the permanent magnets being highly coercive permanent magnets.

34. A non-rail bound vehicle comprising:
(a) at least one drive electromotor;
(b) an internal combustion engine and a current generator adapted to be driven by the internal combustion engine;
(c) the at least one electromotor has a respective motor controller associated therewith for presetting an instantaneous nominal torque of the at least one electromotor;
(d) the internal combustion engine/generator group has a current generating controller associated therewith; and
(e) a central controller which is connected to the respective motor controller of the at least one electromotor and to the current generating controller and which, based on the electrical power requirements of the at least one electromotor, controls the internal combustion engine via the current generating controller to achieve low pollutant emissions.

35. A vehicle according to claim 34, wherein the at least one drive electromotor comprises at least two drive electromotors, a first one thereof being provided for driving a driving wheel on the left side of the vehicle and a second one thereof being provided for driving a driving wheel on the right side of the vehicle, each of the at least two electromotors having a respective motor controller associated therewith, and the central controller controls the internal combustion engine via the current generating controller based on the electrical power requirements of the at least two electromotors.

36. A vehicle according to claim 34, wherein the generator is operable as a starter for the internal combustion engine.

37. A vehicle according to claim 34, wherein the at least one electromotor is switchable to generator operation for braking the vehicle, and wherein at least one braking resistor is provided for dissipating braking energy.

38. A vehicle according to claim 34, wherein at least one of the at least one electromotor and the generator is a machine excited by permanent magnets, with the permanent magnets being highly coercive permanent magnets.

39. A non-rail bound vehicle comprising:
(a) at least one drive electromotor;
(b) an internal combustion engine and a current generator adapted to be driven by the internal combustion engine;
(c) the at least one electromotor has a respective motor controller associated therewith for presetting an instantaneous nominal torque of the at least one electromotor;
(d) the internal combustion engine/generator group has a current generating controller associated therewith; and
(e) a central controller which is connected to the respective motor controller of the at least one electromotor and to the current generating controller and which, based on the electrical power requirements of the at least one electromotor, controls the internal combustion engine via the current generating controller to achieve high power output.

40. A vehicle according to claim 35, wherein the at least one drive electromotor comprises at least two drive electromotors, a first one thereof being provided for driving a driving wheel on the left side of the vehicle and a second one thereof being provided for driving a driving wheel on the right side of the vehicle, each of the at least two electromotors having a respective motor controller associated therewith, and the central controller controls the internal combustion engine via the current generating controller based on the electrical power requirements of the at least two electromotors.

41. A vehicle according to claim 39, wherein the generator is operable as a starter for the internal combustion engine.

42. A vehicle according to claim 39, wherein the at least one electromotor is switchable to generator operation for braking the vehicle, and wherein at least one braking resistor is provided for dissipating braking energy.

43. A vehicle according to claim 39, wherein at least one of the at least one electromotor and the generator is a machine excited by permanent magnets, with the permanent magnets being highly coercive permanent magnets.

* * * * *